United States Patent
Kaplan et al.

(10) Patent No.: US 11,061,712 B2
(45) Date of Patent: Jul. 13, 2021

(54) HOT-PLUGGING OF VIRTUAL FUNCTIONS IN A VIRTUALIZED ENVIRONMENT

(71) Applicant: Red Hat Israel, Ltd., Ra'anana (IL)

(72) Inventors: Alona Kaplan, Ra'anana (IL); Michael Kolesnik, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 16/579,519

(22) Filed: Sep. 23, 2019

(65) Prior Publication Data

US 2020/0019429 A1 Jan. 16, 2020

Related U.S. Application Data

(63) Continuation of application No. 15/239,172, filed on Aug. 17, 2016, now Pat. No. 10,423,437.

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ... G06F 2009/4557; G06F 2009/45595; G06F 9/45558
See application file for complete search history.

(56) References Cited

U.S. PATENT DOCUMENTS

| | | | |
|---|---|---|---|
| 8,418,166 B2 | 4/2013 | Armstrong et al. | |
| 8,533,713 B2 | 9/2013 | Dong | |
| 8,959,310 B2 | 2/2015 | Cardona et al. | |
| 2011/0202983 A1 | 8/2011 | Pope et al. | |
| 2012/0159481 A1* | 6/2012 | Anderson | G06F 9/45558 718/1 |

(Continued)

FOREIGN PATENT DOCUMENTS

WO 2012026939 A1 3/2012

OTHER PUBLICATIONS

"13.2. Using SR-IOV" https://access.redhat.com/documentation/en-US/Red_Hat_Enterprise_Linux/6/html/Virtualization_Host_Configuration_and_Guest_Installation_Guide/sect-Vitualization_Host_Configuration_and_Guest_Installation_Guied-SR_IOV-How_SR_IOV_libvirt_Works.html, Red Hat, Inc., Jun. 30, 2016, 8 pages.

(Continued)

*Primary Examiner* — Jorge A Chu Joy-Davila
(74) *Attorney, Agent, or Firm* — Lowenstein Sandler LLP

(57) ABSTRACT

Implementations of the disclosure provide for hot-plugging of virtual functions in a virtualized environment. In one implementation, a computer system determines that virtual functions associated with a logical network for a virtual machine hosted on a first host system are unavailable on the first host system, identifies a logical network device on a second host system that is communicably accessible from the first host system, and determines that the logical network device on the second host system has a number of available virtual functions associated with the logical network. The computer system then migrates the virtual machine from the first host computer system to the second host computer system to allow the virtual machine to access the number of available virtual functions associated with the logical network on the second host system and associates a virtual device of the virtual machine with the number of available virtual functions.

20 Claims, 6 Drawing Sheets

(56) References Cited

U.S. PATENT DOCUMENTS

| | | | |
|---|---|---|---|
| 2012/0297379 A1* | 11/2012 | Anderson | G06F 9/45558 718/1 |
| 2013/0339955 A1 | 12/2013 | Prawer et al. | |
| 2014/0359607 A1* | 12/2014 | Tsirkin | G06F 9/45533 718/1 |
| 2015/0242227 A1 | 8/2015 | Nair | |
| 2015/0319243 A1 | 11/2015 | Hussain et al. | |
| 2016/0072817 A1 | 3/2016 | Makhervaks et al. | |
| 2016/0103698 A1* | 4/2016 | Yang | G06F 11/203 714/4.11 |
| 2016/0259661 A1 | 9/2016 | Tasoulas et al. | |
| 2016/0294643 A1 | 10/2016 | Kim | |
| 2017/0010907 A1 | 1/2017 | Challa et al. | |
| 2017/0286145 A1* | 10/2017 | Anand | G06F 13/105 |

OTHER PUBLICATIONS

"Adding SR-IOV Devices", https://www.suse.com/documentation/sles11/book_kvm/data/seclibvirt_config_io.html, Suse Doc: Virtualization with KVM, Jul. 5, 2016, 4 pages.

Kaplan, Alona, "Feture/SR-IOV", http://old.ovirt.org/Feature/SR-IOV, last updated Jan. 18, 2016, 13 pages.

Kaplan, Alona et al., "SR-IOV", http://www.ovirt.org/develop/release-management/features/engine/sr-iov/, Jun. 30, 2016, 29 pages.

* cited by examiner

HOT-PLUGGING OF VIRTUAL FUNCTIONS IN A VIRTUALIZED ENVIRONMENT

RELATED APPLICATIONS

This application is a continuation of co-pending U.S. patent application Ser. No. 15/239,172, filed on Aug. 17, 2016, the entire contents of which are hereby incorporated by reference herein.

TECHNICAL FIELD

The disclosure is generally related to network devices, and is more specifically related to hot-plugging of virtual functions in a virtualized environment.

BACKGROUND

A virtual machine (VM) is a portion of software that, when executed on appropriate hardware, creates an environment allowing for the virtualization of an actual physical computer system (e.g., a server, a mainframe computer, etc.). The actual physical computer system is typically referred to as a "host machine," and the operating system (OS) of the host machine is typically referred to as the "host operating system." The operating system (OS) of the virtual machine is typically referred to as the "guest operating system."

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
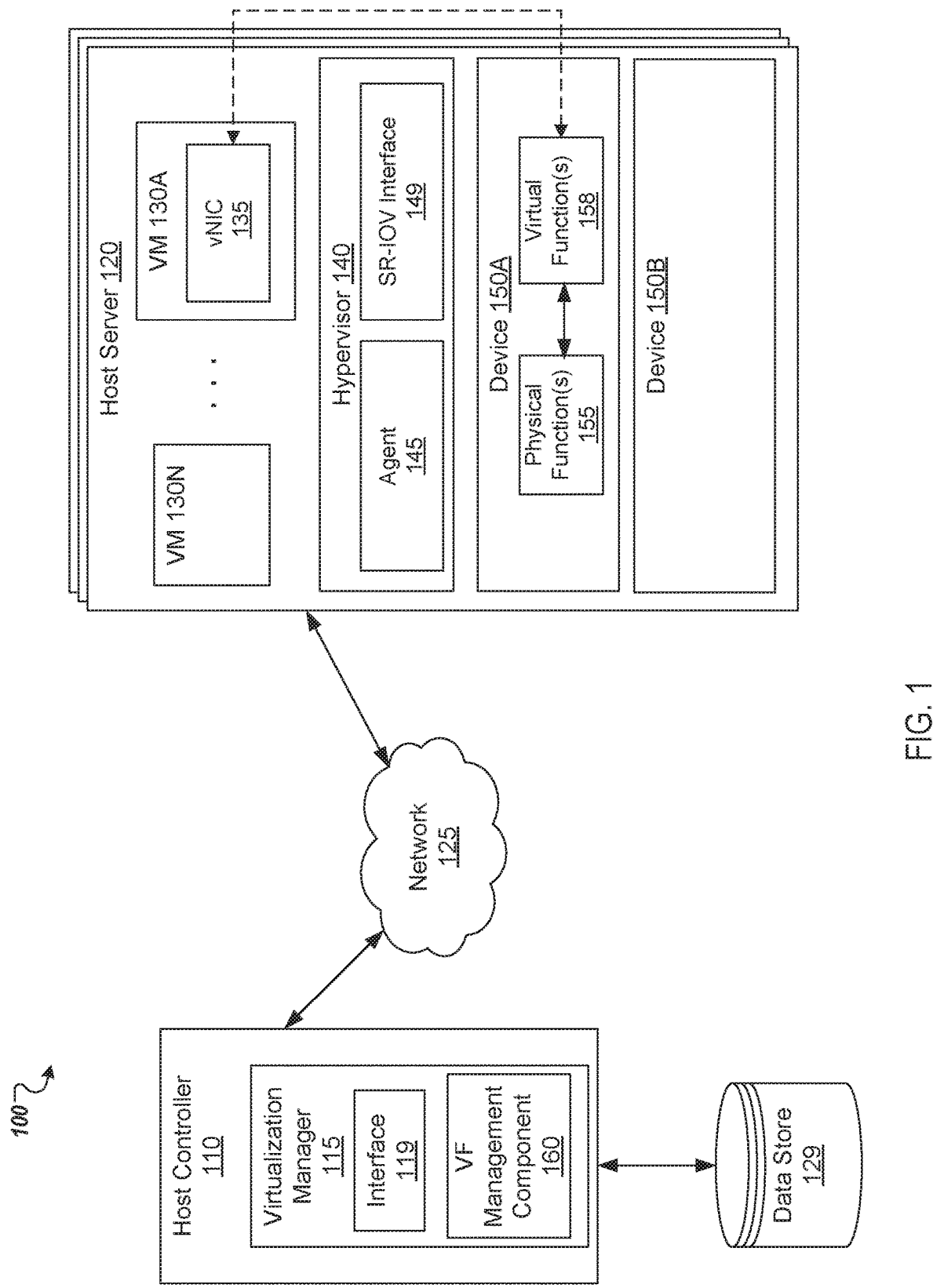
FIG. 1 depicts a block diagram of an example of networked system architecture for hot-plugging of virtual functions in a virtualized environment in accordance with one or more aspects of the disclosure.

The disclosure provides techniques for hot-plugging of virtual functions in a virtual environment. In a virtualized environment, a virtual machine (VM) may comprise one or more "virtual devices," each of which may be associated with a physical device (e.g., a network interface device, an I/O device such as a CD-ROM drive, a disk array, etc.) of a host machine. A virtualization management system, or "virtualization manager," can manage the allocation of the host resources to the VMs, monitor the status of the VMs, as well as the progress of commands and processes being executed by the VMs, and generally manage operations in the system.

A network interface controller (NIC) is a network hardware device that connects the host machine to a network. The NIC may include electronic circuitry used to communicate via a physical layer and data link layer standard, such as Ethernet, Fibre Channel, Wi-Fi, or Token Ring, to name a few examples. The NIC may implement the Open Systems Interconnection (OSI) layer 1 (physical layer) and OSI layer 2 (data link layer) standards, thus providing physical access to a networking medium and a low-level addressing system using media access control (MAC) addresses, in order to allow computing devices to communicate over a wired or wireless network.

Single Root I/O Virtualization (SR-IOV) is a virtualization networking specification that allows a physical device, such as a NIC, to isolate access to its PCI Express (PCIe) hardware resources for manageability and performance reasons. For example, the SR-IOV allows different VMs in a virtual environment to share a single PCI Express hardware interface without interfering with each other. These hardware resources may include physical functions and virtual functions. Physical functions (PFs) are full-featured PCIe devices that include all configuration resources and SR-IOV capabilities for the device. Virtual functions (VFs) are "lightweight" PCIe functions that contain the resources necessary for data movement, but have a minimized set of configuration resources.

A physical NIC on a host machine that is configured based on SR-IOV specifications (also referred to herein as a logical network device) can enable network traffic to flow directly between the VMs that share the same host and VFs of the SR-IOV-enabled NIC. For example, a SR-IOV-enabled NIC may be referred to as supporting a pass-through mode for assigning I/O devices to VMs. In some implementations, a virtual device, such as a virtual NIC (vNIC), associated with a virtual machine can be connected directly (e.g., as opposed to being connect via the virtualization layer of the host machine) to a virtual function using the SR-IOV. This may reduce data transfer latency between the VM and a physical device due to various issues, such as a virtualization layer associated with a host machine or lower CPU utilization devoted to data packet transfers.

In some situations, the virtualization manager may create a VM with SR-IOV virtual function capabilities (e.g., assign a virtual function to the vNIC of the VM). For example, the VM may be used to run client applications. In some implementations, the virtualization manager may not be able to identify an available VF of a SR-IOV enabled NIC associated with a certain network for assigning to the VM. For example, all current VFs associated with a host system may be already attached to other VMs. In such situations, the virtualization manager may generate an error or other types of indicators that there are no available VF's on the system, which can block or otherwise adversely affect the client applications that intended to use the VM.

Aspects of the present disclosure can provide the ability for a virtualization manager to hot-plug a SR-IOV virtual function for a VM when no VFs are currently available for running a physical device. More particularly, a computer system may detect if a host system does not have any available VFs of SR-IOV NICs associated with a certain network and provide various alternative techniques to support the capacities of the VF on the host system. In accordance with the disclosure, the computer system may hot-plug the SR-IOV virtual function by identifying or otherwise creating a new VF to associate with the VM on the fly and without stopping the VM. In some implementations, these alternative techniques may be selected by the system based on, for example, a determined set of system configuration data that is executed in response to the virtualization manager determining that there are no VFs currently available, user service level agreements (SLAs) or other types of system performance data, or the techniques may be provided for selection by a user, such as an administrator, via an interface of the virtualization manager.

In one such technique for the virtual manager to provide a VF associated with a certain network, the computer system of the disclosure may create a new VF by increasing the number of VFs associated with the host system. In some implementations, the computer system may compare the number of currently configured VFs for a SR-IOV NIC associated with the host system to a threshold number of VFs that the SR-IOV NIC can support. For example, the SR-IOV NIC may be configured to support only a certain threshold number of a maximum possible number of VFs for the device to achieve a certain performance level. If this threshold number for the SR-IOV NIC is not met, then the computer system may increase the number of currently configured VFs for that SR-IOV NIC to support the new VF.

In another such technique, when all VFs are allocated and new VFs cannot be created, the VM that needs the SR-IOV virtual function may be migrated to another host machine that has an available VF on the specified network. For example, the computer system may scan the network to discover another host that has a free VF and is capable of meeting the running requirements, such as system memory complicity, processor speed, etc., for executing the VM. Thereupon, the computer system issues a command to "live" migrate the VM to the identified host.

In yet another technique for the virtualization manager to provide a VF associated with a certain network, the VM may be coupled to a virtual bridge if there is no available VF on the network or if there is no available logical device on that network. The virtual bridge may provide an Open Systems Interconnection (OSI) model layer 2 (data link layer) connectivity between two or more network segments. For example, the virtual bridge may be used to provide network connectivity to the VM. In some implementations, the computer system may identify an available VF on another logical device on the network (or another logical device on which a new VF may be created). Then, the computer system may couple the VM to the virtual bridge to provide connectivity to the other logical device, thereby providing the requite network connectivity to the VM. If a VF becomes available on the host associated with the VM, the computer system decouples the VM from the bridge and associates it with the newly available VF on the host. Still further, other options for hot-plugging VFs are possible by utilizing the techniques disclosed herein.

FIG. 1 is an example of networked system architecture 100 in which implementations of the disclosure can be implemented. In some implementations, other architectures for the network architecture 100 are possible for implementing the techniques of the disclosure and are not necessarily limited to the specific architecture depicted by FIG. 1.

As shown in FIG. 1, the network architecture 100 includes a host controller 110 coupled to one or more host servers, such as host server 120, over a network 125. The network 125 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Host controller 110 may be an independent machine that includes one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. Alternatively, the host controller 110 may be part of the host server 120.

In some implementations, the host controller 110 may include a virtualization manager 115 to manage the allocation of resources associated with the one or more host servers. In one implementation, host server 120 may be part of a virtualization system. Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple VMs in order to improve the hardware utilization rate. In some implementations, virtualization manager 115 may manage provisioning of a new VM, connection protocols between clients and VMs, user sessions (e.g., user authentication and verification, etc.), backup and restore, image management, virtual machine migration, load balancing, and so on. The virtualization manager 115 may add a VM, delete a VM, balance the load on the host cluster, provide directory service to the VMs, and/or perform other management functions.

Host server 120 may comprise server computers or any other computing devices capable of running one or more virtual machines (VM) 130A through 130N. Each VM may be a software implementation of a machine that executes programs as though it were an actual physical machine. Each VM runs a guest operating system (OS) (not pictured) that may be different from one virtual machine to another. The guest OS may include Microsoft Windows, Linux, Solaris, Mac OS, etc. Each VM may be linked to one or more virtual disks (not shown). These virtual disks can be logical partitions of a physical disk managed by hypervisor 140, can be cloud based storage devices, or can be some other type of virtual storage device. In one embodiment, virtual disks may form a whole or part of a logical data center. In one embodiment, the VMs (130A-N) and virtual disks, together with host server 120, may be collectively referred to as entities in a virtual machine system.

The host server 120 may comprise a hypervisor 140 that emulates the underlying hardware platform for the VMs (130A-N). The hypervisor 140 may also be known as a virtual machine monitor (VMM) or a kernel-based hypervisor. Hypervisor 140 may take many forms. For example, hypervisor 140 may be part of or incorporated in a host operating system (not shown) of host server 120, or hypervisor 140 may be running on top of the host operating system. Alternatively, hypervisor 140 may a "bare metal" hypervisor that runs on hardware of host server 120 without an intervening operating system. Some examples of hypervisors include quick emulator (QEMU), kernel mode virtual machine (KVM), virtual machine monitor (VMM), etc.

The hypervisor 140 may execute an agent 145 or another type of process that monitors the status of devices running on host server 120. For example, agent 145 can monitor a runtime status of VMs (130A-N), hardware configuration of devices, network and storage connectivity on the host server 120, and similar VM-related and host-related information.

As the virtualization manager 115 collects the information, the agent 145 may store this information for later use. For example, Agent 145 may save this information in a local memory space. Alternatively, agent 145 may save the information to a data store 129 accessible by the virtualization manager 115.

In some implementations, the data store 129 may be a memory (e.g., random access memory), a cache, a drive (e.g., a hard drive), a flash drive, a database system, or another type of component or device capable of storing data. In one implementation, agent 145 can send, receive and store information regarding the VMs (130A-N) via an interface 119 of the virtualization manager 115. Agent 145 may additionally provide and store information upon request from virtualization manager 115 relating to one or more network devices associated with the network architecture 100, which may or may not support virtual function capabilities a further discussed below.

In some implementations, the networked system architecture 100 may comprise one or more devices, such as devices 150A and 150B, (e.g., a network interface device, an I/O device such as a CD-ROM driver, a disk array, etc.), which are available on the host server 120. In some implementations, the hypervisor 140 may use the devices, such as device 150A, to implement virtual networking connectivity for the VMs (130A-N), which allows the VMs to connect with network 125. For example, device 150A may be as a single-root I/O virtualization (SR-IOV)-enabled NIC that enables network traffic to flow directly between VMs (130A-N) and the device 150A. Hypervisor 140 may support the SR-IOV specification, which allows two or more VMs (130A-N) to share a single physical device (e.g., device 150A). Hypervisor 140 may include a SR-IOV component interface 149 that provides SR-IOV specification support. Virtual networking with an SR-IOV-enabled NIC may be referred to as supporting a pass-through mode for assigning I/O devices, such as SR-IOV NIC 150-A, to VMs 130A-130N.

When the hypervisor 140 associates SR-IOV NIC 150A to the VMs 130A-130N, the (SR-IOV) specification may indicate certain physical functions (PFs) 155 and virtual functions (VFs) 158 to be utilized by the VMs. PFs 155 are full-featured Peripheral Component Interconnect Express (PCIe) devices that may include all configuration resources and capabilities for the I/O device. VFs 158 are "lightweight" PCIe functions that contain the resources for data movement, but may have a minimized set of configuration resources. Each VF is derived from a corresponding PF. Although for simplicity only one physical function 155 and virtual function 158 is depicted, in other implementations, multiple physical functions 155 and virtual functions 158 may be present.

A plurality of VFs may be supported by a given logical device. In some implementations, the number of VFs (e.g., VFs 158) that may be supported by a given device (e.g., device 150A) may be limited by the underlying hardware of the device. In an illustrative example, a single Ethernet port may be mapped to multiple VFs that can be shared by one or more of the VMs 130A-130N. An I/O device, such as a virtual NIC device (vNIC) 135, associated with one of the VMs 130A-130N may be provided via a VF, thus bypassing the virtual networking on the host in order to reduce the latency between the VMs 130A-130N and the underlying SR-IOV NIC (e.g., device 150A). The SR-IOV interface component 149 of hypervisor 140 is used to detect and initialize PFs and VFs correctly and appropriately.

In some implementations, hypervisor 140 may support a "pass-through" mode for assigning one or more VFs 158 to the VMs 130A-130N, by utilizing SR-IOV interface component 149. For example, the SR-IOV interface component 149 may be used to map the configuration space of the VFs 158 to the guest memory address range associated with the VMs 130A-130N. In one implementation, each VF may be assigned to a single one of the VMs 130A-130N, as VFs utilize real hardware resources. In some cases, a VM 130A-130N may have multiple VFs assigned to it. A VF appears as a network card on the VM in the same way as a normal network card would appear to an operating system. VFs may exhibit a near-native performance and thus may provide better performance than para-virtualized drivers and emulated access. VFs may further provide data protection between VMs 130A-130N on the same physical server as the data is managed and controlled by the hardware.

In implementations of the disclosure, the virtualization manager 115 can receive a request to create a virtual machine with SR-IOV virtual function capabilities of a device. For example, the user may use interface 119 to mark vNIC 135 associated with VM 130A as an SR-IOV virtual function "pass-through" device. The request may comprise an identifier for a selected logical network to be associated with the vNIC 135 and an SR-IOV virtual function capability. The identifier for the selected logical network may be a unique identifier (e.g., virtual local area network (VLAN) tag, network alias, or the like) that identifies a particular logical network available to the virtualization manager.

The virtualization manager 115 may then determine whether there is an available SR-IOV virtual function associated with the requested logical network. For example, the virtualization manager 115 may include a VF management component 160 to communicate with hypervisors associated with each of the host servers 120 to determine whether there are any virtual functions available to be assigned. If there are no available virtual functions or they are otherwise unavailable, the VF management component 160 implements techniques of the disclosure to hot-plug VF capabilities into the networked system architecture 100 for use by the VM. The functionally of the VF management component 160 can exist in a fewer or greater number of modules than what is shown, with such modules residing at one or more processing devices of networked system architecture 100, which may be geographically dispersed. The VF management component 160 may be operable in conjunction with virtualization manager 115 from which it may receive and determine relevant information for hot-plugging of VFs for use by the VMs 130A-N as discussed in more detail below with respect to FIGS. 2 through 6.

Figure 2:
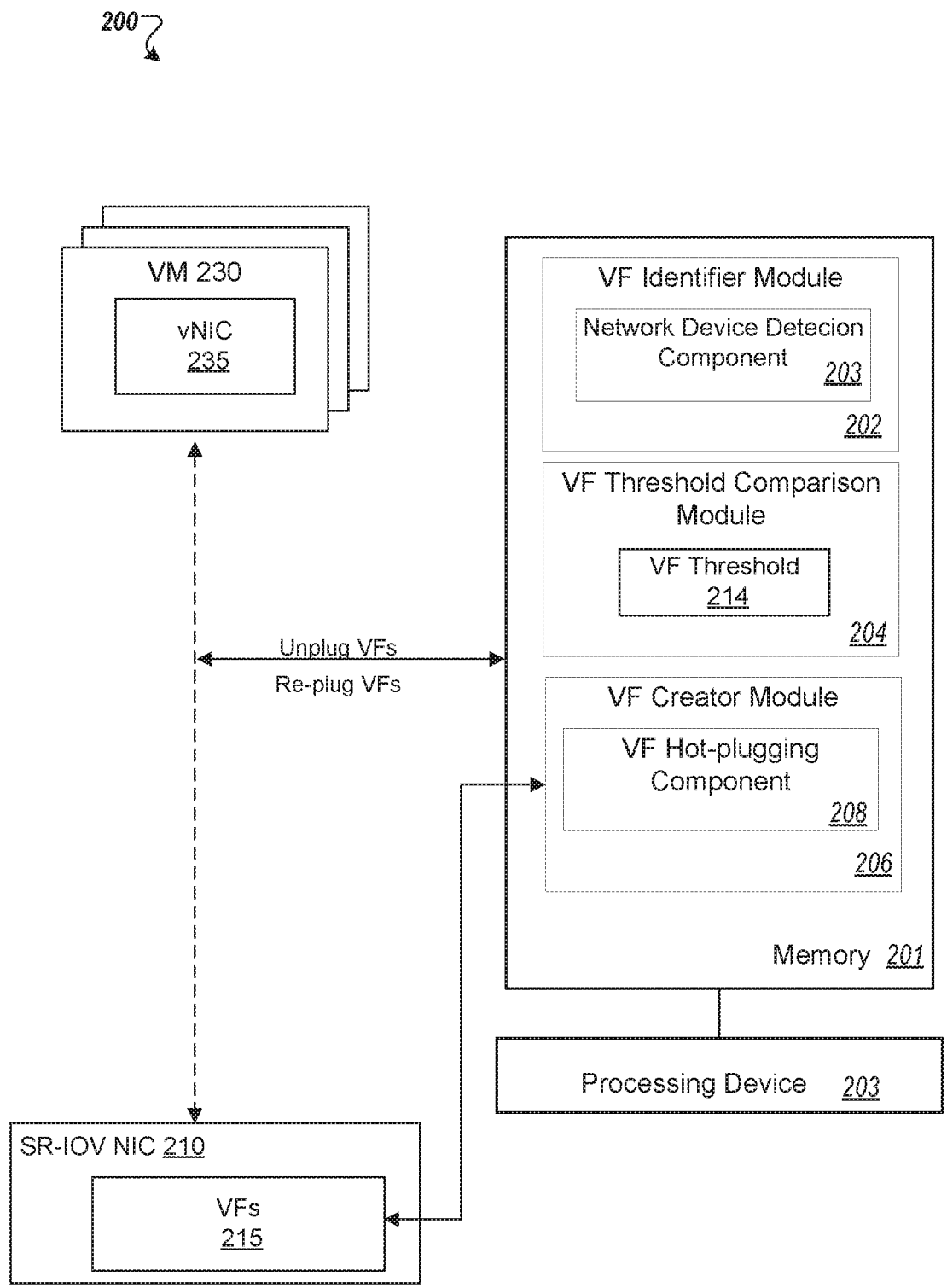
FIG. 2 illustrates an example functional a management computing system including a memory for hot-plugging of virtual functions in accordance with one or more aspects of the disclosure.

FIG. 2 illustrates an example a management computing system 200 including a memory 201 for hot-plugging of virtual functions in a virtualized environment in accordance with one or more aspects of the disclosure. In this example, the management computing system 200 includes a processing device 203 operatively coupled to the memory 201. In some implementations, the processing device 203 may be provided by one or more processors, such as a general purpose processor, for executing instructions. The memory 301 may include a volatile or non-volatile memory device, and other types of computer-readable medium, or combination thereof that is capable of storing relevant data related to the virtual functions and instructions for carrying out the operations of the management computing system 200.

In some implementations, the memory 201 and processing device 203 may correspond to a memory and processing device within system architecture 100 of FIG. 1. For example, host controller 110 and/or host server 120 of the networked system architecture 100 may comprise the memory 201 and processing device 203 or some combination thereof for hot-plugging virtual function as disclosed herein. The processing device 203 may execute instructions stored in the memory for carrying out the operations of the modules as discussed herein.

As shown in FIG. 2, management computing system 200 may include modules for hot-plugging virtual functions. These modules may include a VF identifier module 202, a virtual function (VF) threshold comparison module 204 and a VF creator module 206 stored in memory 301 of the computing system 200. Virtualization manager 115 may use management computing system 200 to hot-plug a SR-IOV virtual function when no VFs are currently available on a logical network device (e.g., SR-IOV NIC) to associate with a VM. In some implementations, the virtualization manager 115 may receive a client request to configure a VM with SR-IOV virtual function capabilities (e.g., assign a virtual function to a vNIC 235 of VM 230) for connecting to a network for use with some client applications. In response to the request, the virtualization manager 115 may execute the VF identifier module 202 to determine whether there is a virtual function available to support connective to the network specified in the request.

To determine whether there are any virtual functions available for running the vNIC 235, the VF identifier module 202 may identify a plurality of hypervisors associated with the virtualization manager 115. For example, the virtualization manager 115 may maintain a reference identifier to the hypervisors, in memory, in a configuration file, in a data store 129 or in any similar storage device, as hypervisors are added for management in the networked system architecture 100. The VF identifier module 202 may examine each hypervisor from the pularity of hypervisors and determine whether there are any virtual function available to be assigned to the VM 230 that are associated with the requested network.

In some implementations, the module 202 may make the determination that all of the VFs are unavailable based on the availability status of the virtual functions, such as VFs 215, for a logical network device (e.g., SR-IOV NIC 210) associated with each hypervisor of the plurality of hypervisors. For example, module 202 may send a request to an agent, such as agent 145, executing on the hypervisors for the availability status of the virtual functions of logical network device associated with the hypervisor. The availability status may indicate whether the virtual function is available for assignment according to whether it has already been assigned to a virtual machine, whether it has been attached to some other type of device, or whether it is unavailable to be assigned for other reasons. The availability status may be stored locally by the virtualization manager 115 in a data store 129, in a memory space, or in any similar manner, and retrieve by the module 202.

If the VF identifier module 202 determines that there is an available virtual function, the management computing system 200 may provide a notification to the virtualization manager 115 of the availability status of the virtual function. The virtualization manager 115 may assign the available virtual function to the vNIC 235 of VM 230. Subsequently, the virtualization manager 115 may launch the VM 230 on the hypervisor associated with the available virtual function. If the VF identifier module 202 determines that there is no available virtual function or that the virtual functions to provide connectively to the network are unavailable, the management computing system 200 may attempt to increase the number available virtual functions for a logical network device that can provide support for the vNIC 235 of VM 230.

To increase the number available virtual functions, the VF identifier module 202 identifies a logical network device that can support the network. For example, a network device detection component 203 of the module 202 may detect a logical network device (e.g., SR-IOV NIC 210, being associated with a number of virtual functions (e.g., VFs 215) currently activated to support the network. In some implementations, the network device detection component 203 examines the logical network devices associated the hypervisors managed by the virtualization manager 115 to identify those devices that can support the network.

For each such logical network device discovered by the network device detection component 203, the management computing system 200 may determine a possible maximum number of VFs for that device. For example, the maximum number of VFs for the device 210 may be coded into the device, for example, from a device vendor. The maximum number is compared to the VFs currently configured for the logical network device. If the VFs currently configured for a logical network device is not at the maximum number of VFs for that device, the management computing system 200 determines if the number of VFs currently configured for the logical network device is over a determined threshold.

VF threshold comparison module 204 may compare the number of the virtual functions currently configured for a logical network device to a threshold amount of virtual functions that may be coupled to that device. For example, the VF threshold comparison module 204 may compare the number of VFs 215 currently configured for device SR-IOV NIC 210 to a VF threshold 214 for that device. The VF threshold 214 may be set in several ways. In some implementations, VF threshold 214 may be set by the virtualization manager 115 in view of network configuration settings provide by, for example, an administrative user. In this regard, the administrative user may set the VF threshold 214 via an interface, such as interface 119, of the virtualization manager 115. The VF threshold 214 may be set to a value so that a total the number of VFs configured for the logical network device does not adversely impact the throughput of network traffic transferred over the device.

If the total the number of VFs configured for the logical network device does not meet the VF threshold 214 for that device in view of the comparison, the VF creator module 206 may identify or create a new VF for the device. For example, the VF creator module 206 may increase the number of VFs 215 associated with SR-IOV NIC 210. In order to increase the number of VFs 215, the module 206 executes a VF hot-plugging component 208 to un-plug all of the VFs 215 from the vNICs using them. For example, the VF hot-plugging module 208 may send a request to the virtualization manager 115 so that the VFs 215 are released by the vNICs, such as vNIC 235, assigned to the VMs, such as VM 230.

After the VFs 215 are unplugged, the VF creator module 206 may increase the number of VFs 215 associated with SR-IOV NIC 210. For example, the VF creator module 206 may adjust a value for a setting on the SR-IOV NIC 210 that indicates the number of VFs supported by this device. In one implementation, the VF creator module 206 may adjust the value so that the SR-IOV NIC 210 can support one additional virtual function. In some implementations, the VF creator module 206 may increase the number of VFs 215 associated with SR-IOV NIC 210 as need by the VMs so long as the increase is still below the VF threshold 214. In some cases, the VF creator module 206 may limit an amount of the increase based on a determination of the service impact on network throughput associated with SR-IOV NIC 210 in view of the increase. This determination ensures that the increase in VFs does not surpass a certain threshold level that could severally impact network traffic transmission and receiving rates at the device.

Once the VFs 215 are increased to support a new VF, the VF hot-plugging component 208 re-plugs all of the VFs 215 back that it un-plugged. For example, the module 208 may send a request to the virtualization manager 115 to reassign the VFs of the device to vNICs that were previously released. The virtual manager 115 then assigns the newly available VF to the vNIC 235 of the newly created VM 230. Thereafter, the virtual manager 115 may provide a notification of an availability of the new vNIC 235 associated with the VM 230, for example, to a client via the interface 119.

Figure 3:
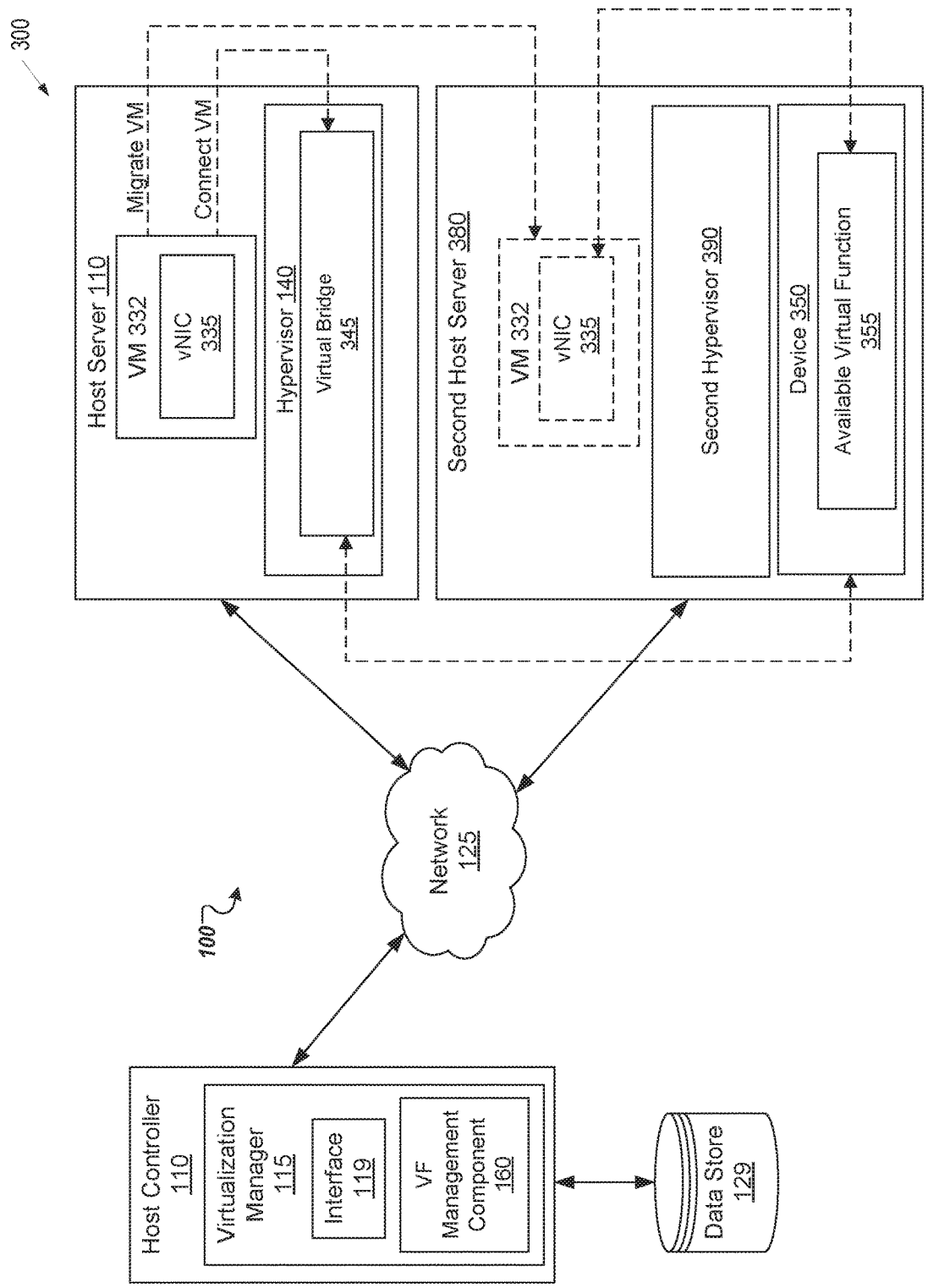
FIG. 3 depicts another view of the example networked system architecture of FIG. 1 in accordance with one or more aspects of the disclosure.

FIG. 3 depicts another view 300 of the example networked system architecture 100 of FIG. 1 in accordance with one or more aspects of the disclosure. As discussed above, the network architecture 100 includes a host controller 110 coupled to one or more host servers, such as host server 120 and host server 380, over a network 125. In this regard, the host controller 110 includes virtualization manager 115 to manage the allocation of resources of hypervisors 140, 390 associated with each of the host servers 120, 380. In some implementations, the hypervisors 140 and 380 may use a SR-IOV enabled NIC device to implement virtual networking connectivity for the VMs executed by hypervisors, which allows the VMs to connect with network 125. For example, hypervisor 140 may associate a virtual device, such as vNIC 335, of VM 332 to certain virtual functions (VFs) and physical functions (PFs) of the device to be utilized by the VM 332.

In some situations, there may not be any free VFs to assign to VM 332 because they are all currently in use by other devices or there may not be a logical device on host server 110 associated with VM 332. In such situations, aspects of the present disclosure can provide the ability for the virtualization manager 115 to hot-plug a SR-IOV virtual function for use by the VM 332. In one example, the VF management component 170 of the virtualization manager may couple VM 332 to virtual bridge 345 until a VF is available. The virtual bridge 345 may be used to provide network connectivity to VM 332. Once a VF becomes available the VF management component 170 may decouple the VM 332 from virtual bridge 345 and recouple it to the newly available VF.

In some implementations, hypervisor 140 may implement the virtual bridge 345. The virtual bridge 345 is a component (e.g., computer-readable instructions implementing software) used to unite two or more network segments. The virtual bridge 345 behaves similar to a virtual network switch, working transparently, such that virtual machines that are connected to the bridge 345 do not know about its existence. Both real and virtual devices of the VMs may be connected to the virtual bridge 345. In some implementations, the hypervisor 140 may provide the functionality of the virtual bridge 345 by connecting the VMs, such as VM 332, that the hypervisor manages to the bridge.

In some implementations, the VF management component 170 may scan network 125 to identify anther host, such a second host server 380 that has an available VF 355 on the network 125. For example, the VF management component 170 may execute the network device detection component 203 of FIG. 2 to identify logical network device 350 that has the available VF 355. As noted above, the VF identifier module 202 may determine whether there is a virtual function available to support connective to the network 125 by scanning the hypervisors being managed by the virtualization manager 115. In some implementations, the VF management component 170 may also determine whether a second hypervisor 390 on a second host machine 380 meets the running requirements to be able to execute the VM 332. In one implementation, the VF management component 170 may hot-plug an available VF 355 into a device 350 associated with the second hypervisor 390 using, for example, the management computing system 200 of FIG. 2.

Once the logical network device 350 is identified, the VF management component 170 couple VM 332 to the virtual bridge that is coupled to logical network device 350 in order to provide network connectivity to VM 332. In some implementations, after the VM 332 is coupled to virtual bridge 345, the VF management component 170 monitors the host server 110 to determine if a virtual function becomes available. In an illustrative example, the VF management component 170 may monitor the availability status of the virtual functions associated with the host server 110. In some implementations, the VF management component 170 may receive the availability status for each virtual function from the virtualization manager 115. As noted above, the availability status may be stored locally by the virtualization manager 115 in a data store 129, in a memory space, or in any similar storage device.

In other implementations, the management component 170 monitors the VMs that operate on hypervisor 140 for utilization change associated with the virtual functions. For example, the management component 170 may determine whether the hypervisor 140 has stopped one or more of the VMs, migrated the VMs to a new hypervisor, unplug a NIC for the VMs, etc. In response to the monitoring, the management component 170 may detect that a newly available virtual function associated with the first host machine. In such as case, the management component 170 decouples VM 332 from the virtual bridge 345 by unplugging vNIC 335 from the bridge. Thereafter, the management component 170 associates or otherwise assigns the vNIC 335 of the VM 332 to the newly available virtual function of host server 110.

In some implementations, the VF management component 170 may issue a request to the virtualization manager 115 to "live" migrate the VM 322 from host server 110 to the second host server 380 with the available VF. Live migration herein refers to the process of moving a running virtual machine from an origin host computer system to a destination host computer system without disrupting the guest operating system and/or the applications executed by the virtual machine.

During the live migration, the virtualization manager 115 may copy a portion of an execution state of the virtual machine being migrated from host server 110 to destination host server 180 while the virtual machine is still running at the origin host. Upon completing the copy, the virtualization manager 115 stops virtual machine 322 at the first hypervisor 140 and re-starts the virtual machine 322 at the second hypervisor 390. Thereupon, the virtualization manager 115 assigns an available VF 355 of the second hypervisor 390 to vNIC 335 and sends a notification of an availability of vNIC 335, which indicates the availability status of the available VF 355 for accessing network 125.

Figure 4:
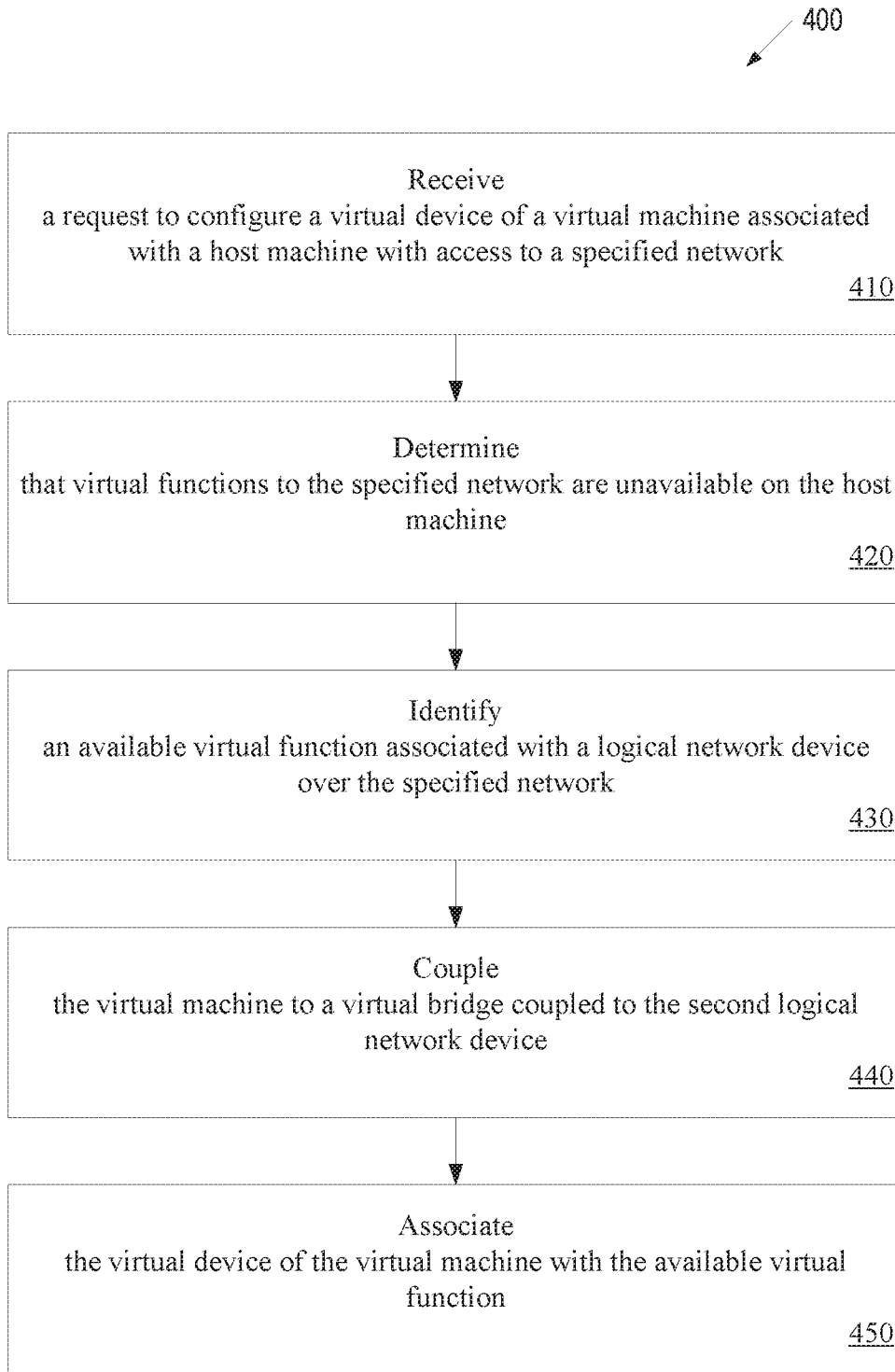
FIG. 4 depicts a flow diagram of a method for hot-plugging of virtual functions in accordance with one or more aspects of the disclosure.

FIG. 4 depicts a flow diagram of a method for hot-plugging of virtual functions in accordance with one or more aspects of the disclosure. In one implementation, the processing device 203 of FIG. 2 as direct by the VF management component 160 of FIG. 1 may implement method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. In some implementations, the blocks depicted in FIG. 4 can be performed simultaneously or in a different order than that depicted.

Method 400 begins at block 410 where a request to configure a virtual device of a virtual machine associated with a host machine with access to a specified network is received. In block 420, a determination is made that virtual functions to the specified network are unavailable on the host machine. An available virtual function associated with a logical network device is identified in block 430 over the specified network. In block 440, the virtual machine is coupled to a virtual bridge coupled to the second logical network device. In block 450, the virtual device of the virtual machine is associated with the available virtual function.

Figure 5:
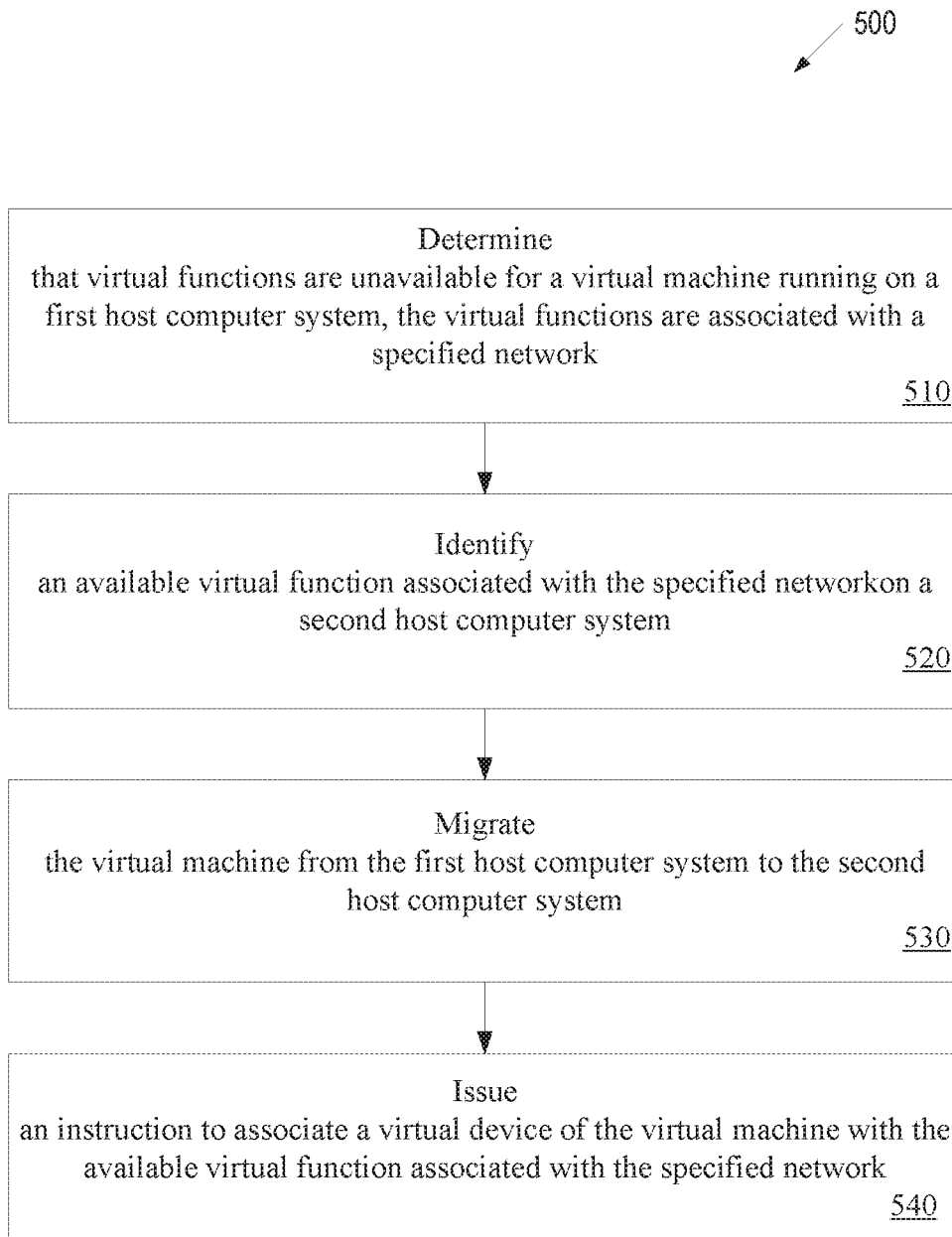
FIG. 5 depicts a flow diagram of another method for hot-plugging of virtual functions in accordance with one or more aspects of the disclosure.

FIG. 5 depicts a flow diagram of another method for hot-plugging of virtual functions in accordance with one or more aspects of the disclosure. In one implementation, the processing device 203 of FIG. 2 as direct by the VF management component 160 of FIG. 1 may implement method 500. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of a shared storage system. In some implementations, the blocks depicted in FIG. 5 can be performed simultaneously or in a different order than that depicted.

Method 500 begins at block 510 where a determination is made that virtual functions are unavailable for a virtual machine running on a first host computer system. The virtual functions are associated with a specified network. In block 520, an available virtual function for the specified network associated with is identified on a second host computer system. In block 530, the virtual machine is migrated from the first host computer system to the second host computer system. Thereupon, an instruction to associate a virtual device of the virtual machine with the available virtual function associated with the specified network is issued in block 540.

Figure 6:
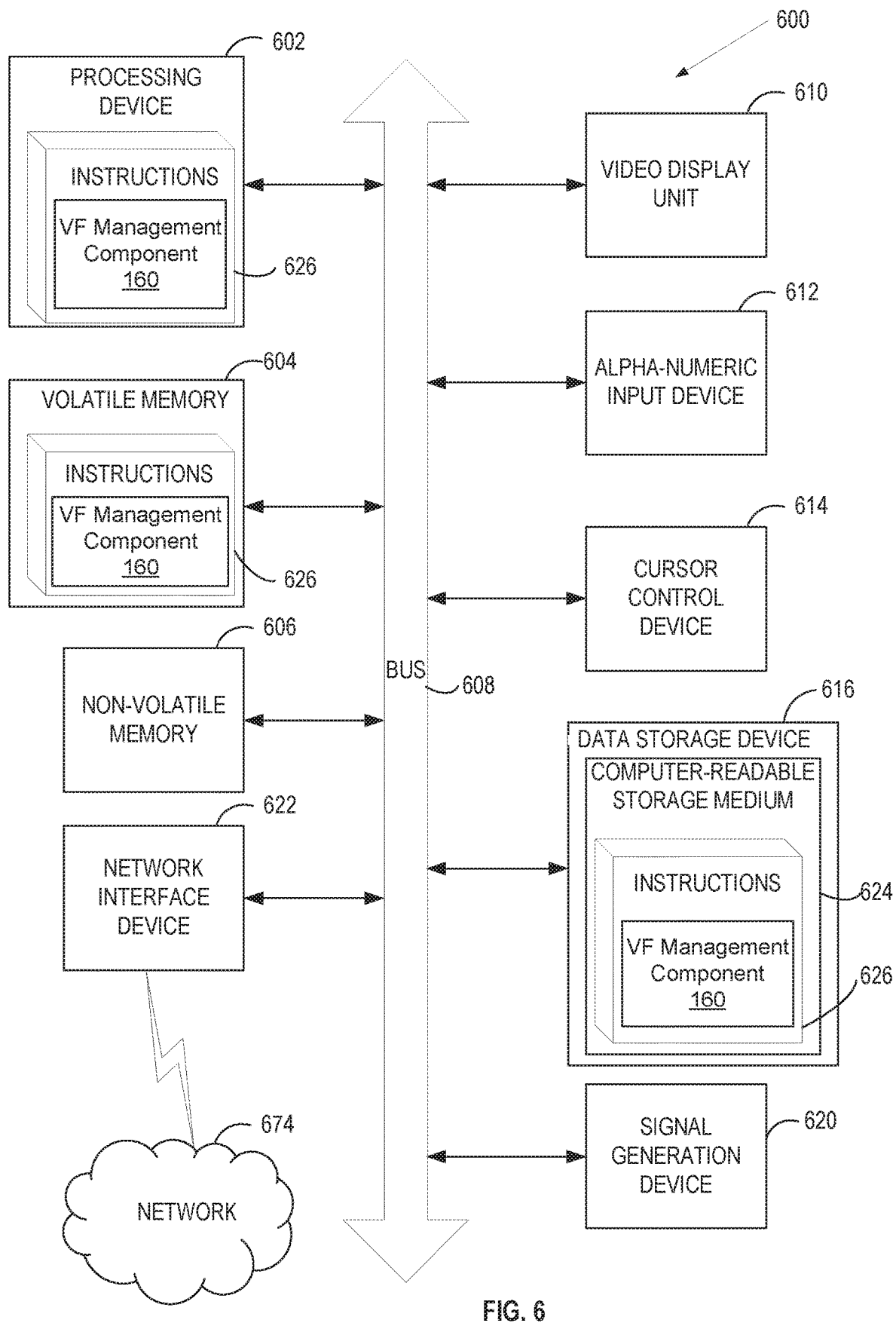
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a processing device within system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine/host device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for managing secret keys in a virtualized data-center.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage domain 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage domain 616 may include a non-transitory computer-readable storage medium 624 on which may store instructions 626 encoding any one or more of the methods or functions described herein, including instructions for implementing method 400 of FIG. 4 or method 500 of FIG. 5 for hot-plugging of virtual functions.

Instructions 626 may also reside, completely or partially, within volatile memory 604 and/or within processing device 602 during execution thereof by computer system 600, hence, volatile memory 604 and processing device 602 may also constitute machine-readable storage media.

While non-transitory computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, firmware modules or functional circuitry within hardware devices may implement the methods, components, and features of the disclosure. Further, the methods, components, and features may be implemented in any combination of hardware devices and computer program components, or in computer programs.

Unless specifically stated otherwise, terms such as "selecting," "determining," "adjusting," "comparing," "identifying," "associating," "monitoring," "migrating," "issuing," "plugging," "un-plugging" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A computer system, comprising:
a memory; and
a processing device, operatively coupled to the memory, to:
communicate with a first hypervisor on a first host system to determine that virtual functions associated with a logical network for a virtual machine hosted on the first host system are unavailable on a logical network device of the first host system, wherein the logical network device of the first host system has reached a threshold number of virtual functions able to be associated with the logical network device; and
responsive to determining that the virtual functions are unavailable on the first host system and that no additional virtual functions can be created on the logical network device of the first host system based on the threshold number of virtual functions:
identify a logical network device on a second host system of a plurality of host systems that is communicably accessible to the first hypervisor from the first host system;
determine that the logical network device on the second host system has a number of available virtual functions associated with the logical network and meets running requirements to execute the virtual machine;
migrate the virtual machine from the first host computer system to the second host system of the plurality of host systems to allow the virtual machine to access the number of available virtual functions associated with the logical network on the second host system; and
associate a virtual device of the virtual machine with the number of available virtual functions.

2. The computer system of claim 1, wherein to identify the logical network device, the processing device is further to:
identify a hypervisor associated with the logical network that is capable of supporting the virtual functions; and
determine availability of at least one virtual function associated with the identified hypervisor.

3. The computer system of claim 1, wherein the processing device is further to:
notify a client application of availability of the virtual device associated with the virtual machine.

4. The computer system of claim 1, wherein the processing device is further to:
couple the virtual device of the virtual machine to a virtual bridge;
identify an available virtual function associated with a second logical network device on the logical network; and
couple the virtual bridge to the second logical network device.

5. The computer system of claim 1, wherein the processing device is further to:
associate the virtual device with the number of available virtual functions without stopping the virtual machine.

6. The computer system of claim 1, wherein to migrate the virtual machine from the first host computer system to the second host computer system, the processing device is further to:
copy at least a portion of an execution state of the virtual machine while the virtual machine is still running on the first host computer system;
stop the virtual machine on the first host computer system; and
restart the virtual machine on the second host computer system using the portion of the execution state.

7. The computer system of claim 1, wherein the processing device is further to:
scan the logical network to discover the second host system having the number of available virtual functions.

8. A method comprising:
communicating with a first hypervisor on a first host system to determine that virtual functions associated with a logical network for a virtual machine hosted on the first host system are unavailable on a logical network device of the first host system, wherein the logical network device of the first host system has reached a threshold number of virtual functions able to be associated with the logical network device; and responsive to determining that the virtual functions are unavailable on the first host system and that no additional virtual functions can be created on the logical network device of the first host system based on the threshold number of virtual functions:
- identifying a logical network device on a second host system of a plurality of host systems that is communicably accessible to the first hypervisor from the first host system;
- determining that the logical network device on the second host system has a number of available virtual functions associated with the logical network and meets running requirements to execute the virtual machine;
- migrating the virtual machine from the first host computer system to the second host system of the plurality of host systems to allow the virtual machine to access the number of available virtual functions associated with the logical network on the second host system; and
- associating a virtual device of the virtual machine with the number of available virtual functions.

9. The method of claim 8, wherein identifying the logical network device comprises:
- identifying a hypervisor associated with the logical network that is capable of supporting the virtual functions; and
- determining availability of at least one virtual function associated with the identified hypervisor.

10. The method of claim 8, further comprising:
notifying a client application of availability of the virtual device associated with the virtual machine.

11. The method of claim 8, further comprising:
- coupling the virtual device of the virtual machine to a virtual bridge;
- identifying an available virtual function associated with a second logical network device on the logical network; and
- coupling the virtual bridge to the second logical network device.

12. The method of claim 8, further comprising:
associating the virtual device with the number of available virtual functions without stopping the virtual machine.

13. The method of claim 8, wherein migrating the virtual machine from the first host computer system to the second host computer system comprises:
- copying at least a portion of an execution state of the virtual machine while the virtual machine is still running on the first host computer system;
- stopping the virtual machine on the first host computer system; and
- restarting the virtual machine on the second host computer system using the portion of the execution state.

14. The method of claim 8, further comprising:
scanning the logical network to discover the second host system having the number of available virtual functions.

15. A non-transitory computer readable storage medium, having instructions stored therein, which when executed by a processing device of a management system, cause the processing device to:
- communicate with a first hypervisor on a first host system to determine that virtual functions associated with a logical network for a virtual machine hosted on the first host system are unavailable on a logical network device of the first host system, wherein the logical network device of the first host system has reached a threshold number of virtual functions able to be associated with the logical network device; and
- responsive to determining that the virtual functions are unavailable on the first host system and that no additional virtual functions can be created on the logical network device of the first host system based on the threshold number of virtual functions:
  - identify a logical network device on a second host system of a plurality of host systems that is communicably accessible to the first hypervisor from the first host system;
  - determine that the logical network device on the second host system has a number of available virtual functions associated with the logical network and meets running requirements to execute the virtual machine;
  - migrate the virtual machine from the first host computer system to the second host system of the plurality of host systems to allow the virtual machine to access the number of available virtual functions associated with the logical network on the second host system; and
  - associate a virtual device of the virtual machine with the number of available virtual functions.

16. The non-transitory computer readable storage medium of claim 15, wherein to identify the logical network device, the instructions cause the processing device to:
- identify a hypervisor associated with the logical network that is capable of supporting the virtual functions; and
- determine availability of at least one virtual function associated with the identified hypervisor.

17. The non-transitory computer readable storage medium of claim 15, wherein the instructions further cause the processing device to:
notify a client application of availability of the virtual device associated with the virtual machine.

18. The non-transitory computer readable storage medium of claim 15, wherein the instructions further cause the processing device to:
- couple the virtual device of the virtual machine to a virtual bridge;
- identify an available virtual function associated with a second logical network device on the logical network; and
- couple the virtual bridge to the second logical network device.

19. The non-transitory computer readable storage medium of claim 15, wherein the instructions further cause the processing device to:
associate the virtual device with the number of available virtual functions without stopping the virtual machine.

20. The non-transitory computer readable storage medium of claim 15, wherein to migrate the virtual machine from the first host computer system to the second host computer system, the instructions cause the processing device to:
- copy at least a portion of an execution state of the virtual machine while the virtual machine is still running on the first host computer system;
- stop the virtual machine on the first host computer system; and
- restart the virtual machine on the second host computer system using the portion of the execution state.

* * * * *